(12) United States Patent
Hwang et al.

(10) Patent No.: US 10,375,948 B2
(45) Date of Patent: Aug. 13, 2019

(54) TRAP FOR CONTROLLING TERMITES

(71) Applicant: National Institute of Forest Science, Seoul (KR)

(72) Inventors: Wonjoung Hwang, Chuncheon-si (KR); Dongwon Son, Seoul (KR); Jinyoung Chung, Seoul (KR); Geumman Kang, Seoul (KR)

(73) Assignee: NATIONAL INSTITUTE OF FOREST SCIENCE, Seoul (KR)

( * ) Notice: Subject to any disclaimer, the term of this patent is extended or adjusted under 35 U.S.C. 154(b) by 358 days.

(21) Appl. No.: 15/335,583

(22) Filed: Oct. 27, 2016

(65) Prior Publication Data

US 2017/0118971 A1    May 4, 2017

(30) Foreign Application Priority Data

Oct. 28, 2015    (KR) .................. 10-2015-0150326

(51) Int. Cl.
*A01M 1/02*    (2006.01)
*A01M 1/10*    (2006.01)
*A01M 1/20*    (2006.01)

(52) U.S. Cl.
CPC ............ *A01M 1/2011* (2013.01); *A01M 1/02* (2013.01); *A01M 1/103* (2013.01)

(58) Field of Classification Search
CPC .......... A01M 1/14; A01M 1/103; A01M 1/02; A01M 1/2011
USPC ........................................................ 43/121
See application file for complete search history.

(56) References Cited

U.S. PATENT DOCUMENTS

| | | | | | |
|---|---|---|---|---|---|
| 1,103,259 | A | * | 7/1914 | Buckley | A01M 1/14 43/115 |
| 2,177,670 | A | * | 10/1939 | Peirson | A01M 1/02 43/107 |
| 2,372,747 | A | * | 4/1945 | Sullivan | A01M 1/10 229/115 |
| 3,821,861 | A | * | 7/1974 | Jalbert | A01K 69/08 43/100 |
| 3,864,867 | A | * | 2/1975 | Dry | A01M 1/14 43/131 |
| 3,913,259 | A | * | 10/1975 | Nishimura | A01M 1/02 43/114 |
| 4,044,495 | A | * | 8/1977 | Nishimura | A01M 1/02 43/114 |

(Continued)

FOREIGN PATENT DOCUMENTS

| | | | |
|---|---|---|---|
| EP | 0898886 A1 | 3/1999 | |
| EP | 2210488 A2 * | 7/2010 | ............. A01M 1/14 |

(Continued)

*Primary Examiner* — Magdalena Topolski
*Assistant Examiner* — Morgan T Barlow
(74) *Attorney, Agent, or Firm* — Novick, Kim & Lee; Jae Youn Kim

(57) ABSTRACT

A trap for controlling termites includes a main body and an insecticide portion disposed in the main body. The main body of the trap has a hollow triangular structure and includes a first outer wall configured to contact a first installment surface, a second outer wall configured to contact a second installment surface and connected to the first outer wall so as to form an angle between the first outer wall and the second outer wall, and at least one termite entrance hole formed on the first outer wall or the second outer wall.

4 Claims, 7 Drawing Sheets

(56) References Cited

U.S. PATENT DOCUMENTS

| | | | | |
|---|---|---|---|---|
| 4,214,400 A * | 7/1980 | Patmore | A01M 1/103 | 43/121 |
| 4,244,134 A * | 1/1981 | Otterson | A01M 23/005 | 43/114 |
| 4,581,845 A * | 4/1986 | Burkholder | A01M 1/02 | 43/107 |
| 4,866,877 A * | 9/1989 | Barak | A01M 1/02 | 43/121 |
| 5,048,224 A * | 9/1991 | Frisch | A01M 1/02 | 43/107 |
| 5,303,501 A * | 4/1994 | Seemann | A01M 1/026 | 43/114 |
| D346,847 S * | 5/1994 | Barbanera | D22/125 | |
| 5,394,640 A * | 3/1995 | Musket | A01M 1/14 | 43/114 |
| 5,396,729 A * | 3/1995 | Vejvoda | A01M 1/02 | 43/114 |
| 5,406,744 A | 4/1995 | Schneider et al. | | |
| 5,513,465 A * | 5/1996 | Demarest | A01M 1/145 | 43/113 |
| 5,531,043 A * | 7/1996 | Shiboh | A01M 1/14 | 43/121 |
| 5,572,825 A * | 11/1996 | Gehret | A01M 1/02 | 229/120.11 |
| 5,608,988 A * | 3/1997 | Dowling | A01M 1/14 | 43/114 |
| 5,649,385 A * | 7/1997 | Acevedo | A01M 1/14 | 43/114 |
| 5,927,001 A * | 7/1999 | Ballard | A01M 1/2005 | 43/124 |
| 5,937,571 A * | 8/1999 | Megargle | A01M 1/026 | 43/124 |
| 6,158,166 A * | 12/2000 | Snell | A01M 1/026 | 43/121 |
| 6,187,328 B1 | 2/2001 | Ballard et al. | | |
| 6,202,342 B1 * | 3/2001 | Edwards | A01M 1/026 | 43/132.1 |
| 6,233,865 B1 | 5/2001 | Curtis et al. | | |
| 6,370,814 B1 | 4/2002 | Curtis et al. | | |
| 6,516,558 B1 * | 2/2003 | Lingren | A01M 1/02 | 43/107 |
| 6,651,378 B2 * | 11/2003 | Baker | A01M 1/2005 | 43/121 |
| 6,786,016 B1 * | 9/2004 | Wood | A01M 1/2011 | 43/107 |
| D521,102 S * | 5/2006 | Hoyes | D22/122 | |
| 7,377,072 B2 * | 5/2008 | Meier | A01M 1/026 | 43/131 |
| 7,676,985 B1 * | 3/2010 | Perkins | A01M 1/026 | 43/114 |
| 7,748,159 B1 * | 7/2010 | Wenner | A01M 1/24 | 43/114 |
| 8,240,081 B2 * | 8/2012 | Cuellar Bernal | A01M 1/145 | 43/107 |
| 8,793,927 B2 * | 8/2014 | Winkler | A01M 1/14 | 43/107 |
| 2001/0009399 A1 * | 7/2001 | Barber | A01M 1/026 | 340/573.2 |
| 2002/0108295 A1 * | 8/2002 | Aesch, Jr. | A01M 1/026 | 43/132.1 |
| 2006/0053682 A1 * | 3/2006 | Goldstein | A01M 1/10 | 43/67 |
| 2006/0283076 A1 * | 12/2006 | Chambers | A01M 1/02 | 43/114 |
| 2008/0086932 A1 * | 4/2008 | Cook | A01M 1/02 | 43/114 |
| 2010/0154290 A1 * | 6/2010 | Fisher | A01M 1/02 | 43/114 |
| 2010/0325941 A1 * | 12/2010 | Bolin | A01M 1/2016 | 43/131 |
| 2011/0030268 A1 * | 2/2011 | Hickman | A01M 1/2011 | 43/131 |
| 2012/0167309 A1 * | 7/2012 | Heidorn | A01M 1/103 | 5/691 |
| 2012/0285076 A1 * | 11/2012 | Banfield | A01M 1/026 | 43/123 |
| 2013/0067796 A1 * | 3/2013 | Dong | A01M 1/14 | 43/109 |
| 2013/0333274 A1 * | 12/2013 | Mouton | A01M 1/103 | 43/108 |
| 2013/0340320 A1 | 12/2013 | Staunton | | |
| 2014/0000151 A1 * | 1/2014 | Cowen | A01M 1/02 | 43/107 |
| 2014/0123539 A1 * | 5/2014 | Saguchi | A01M 1/02 | 43/2 |
| 2014/0259879 A1 * | 9/2014 | Logsdon | A01M 1/2011 | 43/114 |
| 2015/0007486 A1 | 1/2015 | Backmark et al. | | |
| 2015/0047250 A1 * | 2/2015 | Parks | A01M 1/14 | 43/114 |
| 2017/0006851 A1 * | 1/2017 | Doman | A01M 1/14 | |

FOREIGN PATENT DOCUMENTS

| | | | | |
|---|---|---|---|---|
| FR | 2351595 A1 * | 12/1977 | | A01M 1/14 |
| GB | 1507696 A * | 4/1978 | | A01M 1/02 |
| GB | 2180135 A * | 3/1987 | | A01M 1/14 |
| JP | 02086725 A * | 3/1990 | | A01M 1/14 |
| JP | 05-244852A A | 9/1993 | | |
| JP | 05236858 A * | 9/1993 | | A01M 1/02 |
| JP | 2001-61395 A | 8/1999 | | |
| JP | 2005-021023 A | 1/2005 | | |
| JP | 3197349 U | 4/2015 | | |
| JP | 2017079725 A * | 5/2017 | | A01M 1/103 |
| KR | 10-1996-0000019 | 1/1996 | | |
| KR | 10-2010-0029842 | 3/2010 | | |
| WO | WO-9734471 A1 * | 9/1997 | | A01M 1/14 |
| WO | 1999/031974 A1 | 7/1999 | | |
| WO | 2004/016085 A1 | 2/2004 | | |
| WO | WO-2015129976 A1 * | 9/2015 | | A01M 1/14 |

\* cited by examiner

TRAP FOR CONTROLLING TERMITES

BACKGROUND OF THE INVENTION

1. Field of the Invention

The present invention relates to a trap for controlling termites. More specifically, the present invention relates to a trap for controlling termites which has an excellent control effect by being installed easily on movement routes of termites, such as edge parts or narrow corridors, can be easily treated and installed due to a simple structure, and also can reduce manufacturing or controlling costs.

2. Description of the Related Art

Generally, a termite is an insect causing damage to pillars of wooden structures and other structural materials by eating them. The structures which have been damaged by termites cause the structural instability to buildings.

Termites, which cause fatal damages to wooden structures, lived only in subtropical regions in the past. However, due to global warming and imported wood, the habitats of termites have been expanding.

In addition, termites are sort of social insects which have a colony life. Alate termites, reproductive termites, have wings of same size. Male termites don't die after fertilization and are distinguished from Hymenoptera in which ants are contained because they live with female termites which are able to spawn. Termites go through incomplete metamorphosis, and their big jaws are well-developed to chew. With a class of alates as the center, a colony of termites is composed of ergates, nymphs, soldier ants, young termites, and eggs.

Most of termites that live in Korea are *Reticulitermes speratus*, a kind of a subterranean termite. *Reticulitermes speratus* is found throughout Korea, for example Seoul, Gyeonggi, Gangwon and north part of South Korea. Generally, once damage by termites occurs, although any changes caused from damage may not be found from outside of the building, the cavitation phenomenon is already in progress inside the wooden structure.

Recently as for *Reticulitermes speratus* living in Korea, their population has increased significantly to give more damages to wooden structures, etc. Furthermore, as their distribution altitude has been getting higher, they seem to be spread more. In ecological aspects, termites have characteristics similar to cockroaches. Once termites have obtained their habitats under the ground or inside a wood, they become extremely difficult to control. They mostly live under the ground or inside the wood, and they move through underground tunnel or along the ground. Therefore, after the damage was revealed outside to be checked by eyes, it is most likely that significant damage has already progressed.

In order to solve the above problem caused by the damage from termites, various research and development activities have been progressed all around the world. For example, Korean Patent Publication No. 10-1996-0000019 (publication date: 1996 Jan. 25) proposed a termites alarm device for detecting intrusion of termites. However, as the device could only detect intrusion of termites, it has a limit of not being able to control termites substantially.

Also, Korean Patent Publication No. 10-2010-0029842 (publication date: 2010 Mar. 17) proposed the technique regarding a ground termite station shown in FIG. 1.

The ground termite station is for detecting and controlling termites on the ground. The station 21 is formed as a container 23 with inside space, and at least a part of the container is mounted to be attached on the ground. The container of the station may be closed form or open form which allows to access to the inside space while being mounted on the ground. A cartridge has such a size and configuration that it can be inserted into and separated from the inside space. Generally, the cartridge comprises a gathering members, a bait matrix independent from the gathering members and a holder 65, wherein the holder is assembled with the gathering members and the bait matrix to hold at least a part of them and consequently the cartridge can be placed on the inside space of the container as a single unit.

The ground termite station is somewhat effective for detection and control of termites. However, it has too big size to be installed on movement routes of termites, such as edge parts or narrow corridors. Therefore, it has a low control effect, and it has a limit that it cannot be used adequately according to structural characteristics of complex wooden structures.

Also, it has too big size to be treated and be installed conveniently. In addition, due to many components and a complex structure, it has high manufacturing costs. Therefore, it has disadvantage that the costs for controlling termites are excessively high.

SUMMARY OF THE INVENTION

An object of the present invention, which is to overcome aforementioned problems, is to provide a trap for controlling termites which has an excellent control effect by being installed easily on movement routes of termites, such as edge parts or narrow corridors.

Another object of the present invention is to provide a trap for controlling termites that can be easily treated and installed due to a simple structure, and also can reduce manufacturing or controlling costs.

In order to achieve the above object, a trap for controlling termites according to the present invention could comprise a main body of the trap; and an insecticide portion disposed in the main body; wherein the main body is formed in shape of hollow column, and the main body comprises a first outer wall which touches a first installment surface, a second outer wall which touches a second installment surface and is connected to the first outer wall so as to have a tilt angle against the first outer wall, and at least one termite entrance hole formed on the first outer wall or the second outer wall.

Preferably, the main body could comprise a column portion in shape of triangular column and a lid portion inserted to one end or both ends of the column portion.

A lid mounting portion where the lid portion is inserted could be formed to protrude from the column portion, and the plurality of termite entrance holes could be formed on a joint part of the first outer wall and the second outer wall by cutting along longitudinal direction of the column portion.

The main body could have a connecting portion connected between the first outer wall and the second outer wall, and the connecting portion could have a pleat portion to adjust the angle of the first outer wall and the second outer wall.

The insecticide portion could be formed by providing an insecticide to a base sheet having a material for absorbing moisture to retain moisture.

The base sheet could be made of an acid-free paper which is formed to have an inner space, the material for absorbing moisture could be made of a super absorbent polymer, and a termite food material could be inserted to a hollow portion of the main body or the inner space.

Furthermore, the trap for controlling termites according to the present invention could further comprise a first binding member for fixing the first outer wall on the first installment surface and a second binding member for fixing the second outer wall on the second installment surface.

According to the present invention, the trap is installed so that the first and second outer walls of the trap touch edge parts or narrow corridors which are movement routes of termites, and it kills termites after enticing them to inside. Therefore, the trap is able to be easily installed and control termites effectively.

Because the trap has a simple structure as a shape of triangular column, it can be easily installed and treated. In addition, it is able to reduce manufacturing or controlling costs.

Also, according to the present invention, in the insecticide portion of the trap, besides insecticides, a material for absorbing moisture is provided to retain moisture for a long time. Because termites like moisture, the control effect is maintained for a long time.

Furthermore, according to the present invention, angle between the first and second outer walls can be adjusted by the pleat portion on main body of the trap according to shapes of installment surfaces. Therefore, it is able to be used adaptively.

BRIEF DESCRIPTION OF THE DRAWINGS

These and/or other aspects and advantages of the invention will become apparent and more readily appreciated from the following description of the embodiments, taken in conjunction with the accompanying drawings.

Figure 1:
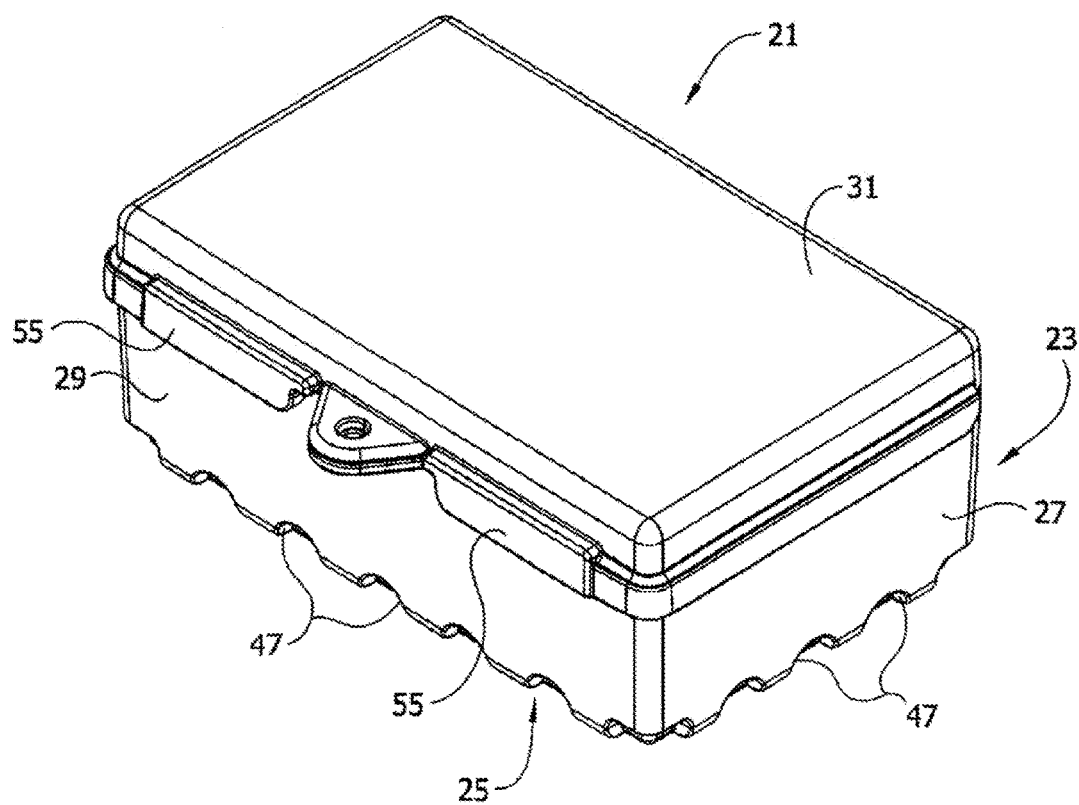
FIG. 1 is a drawing illustrating a conventional trap for controlling termites.

1: main body of a trap
1a: column portion
1b: lid portion
11: first outer wall
12: second outer wall
13: termite entrance hall
14: lid mounting portion
15: connecting portion
16: pleat portion
17: first binding member
18: second binding member
2: insecticide portion
21: base sheet
22: material for absorbing moisture
23: termite food material
p1: first installment surface
p2: second installment surface

DETAILED DESCRIPTION OF THE INVENTION

Hereinafter, an embodiment of the present invention would be explained in detail referring to appended drawings.

Figure 2:
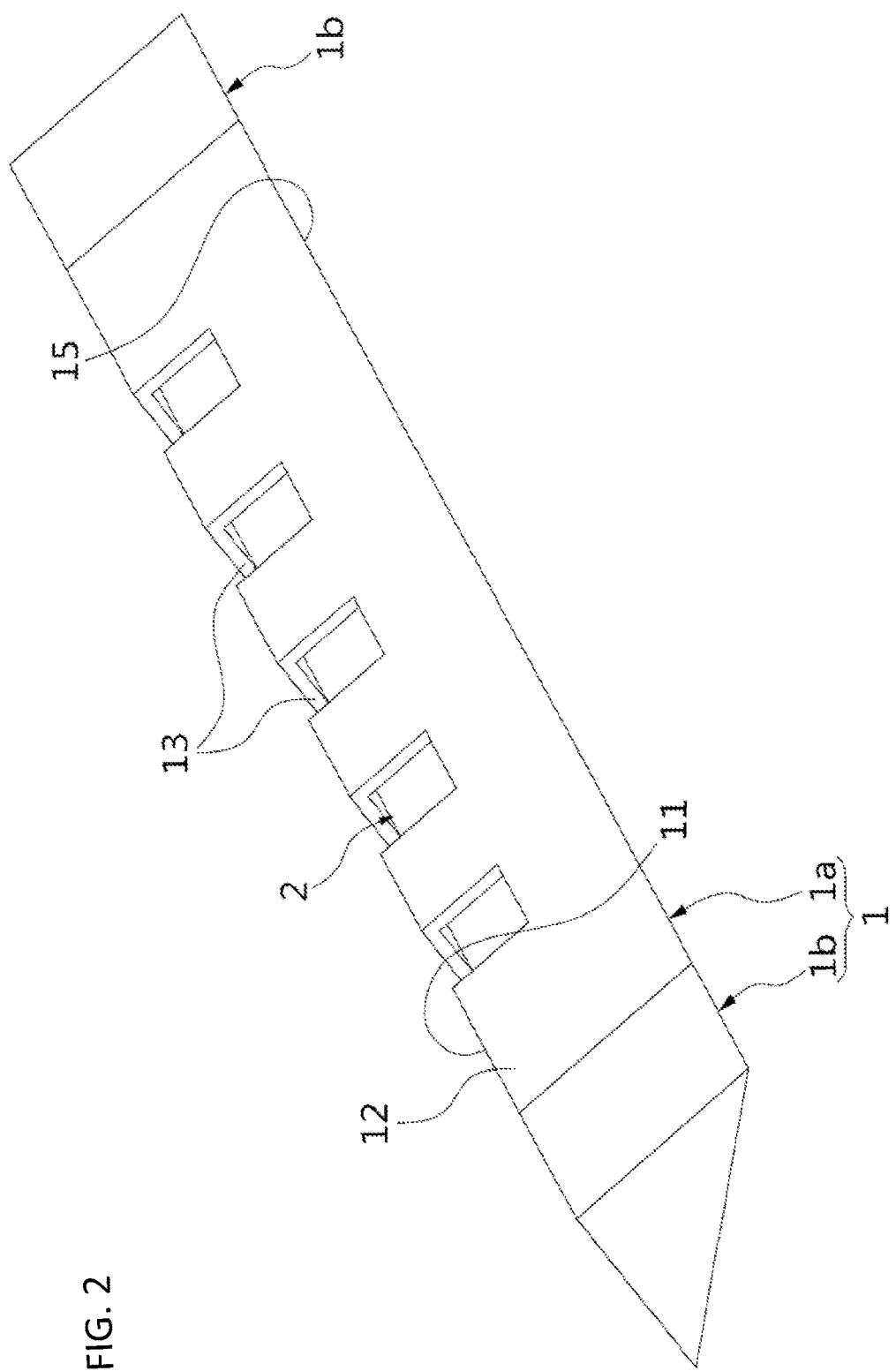
FIG. 2 is a perspective view of a trap for controlling termites according to an embodiment of the present invention.
Figure 3:
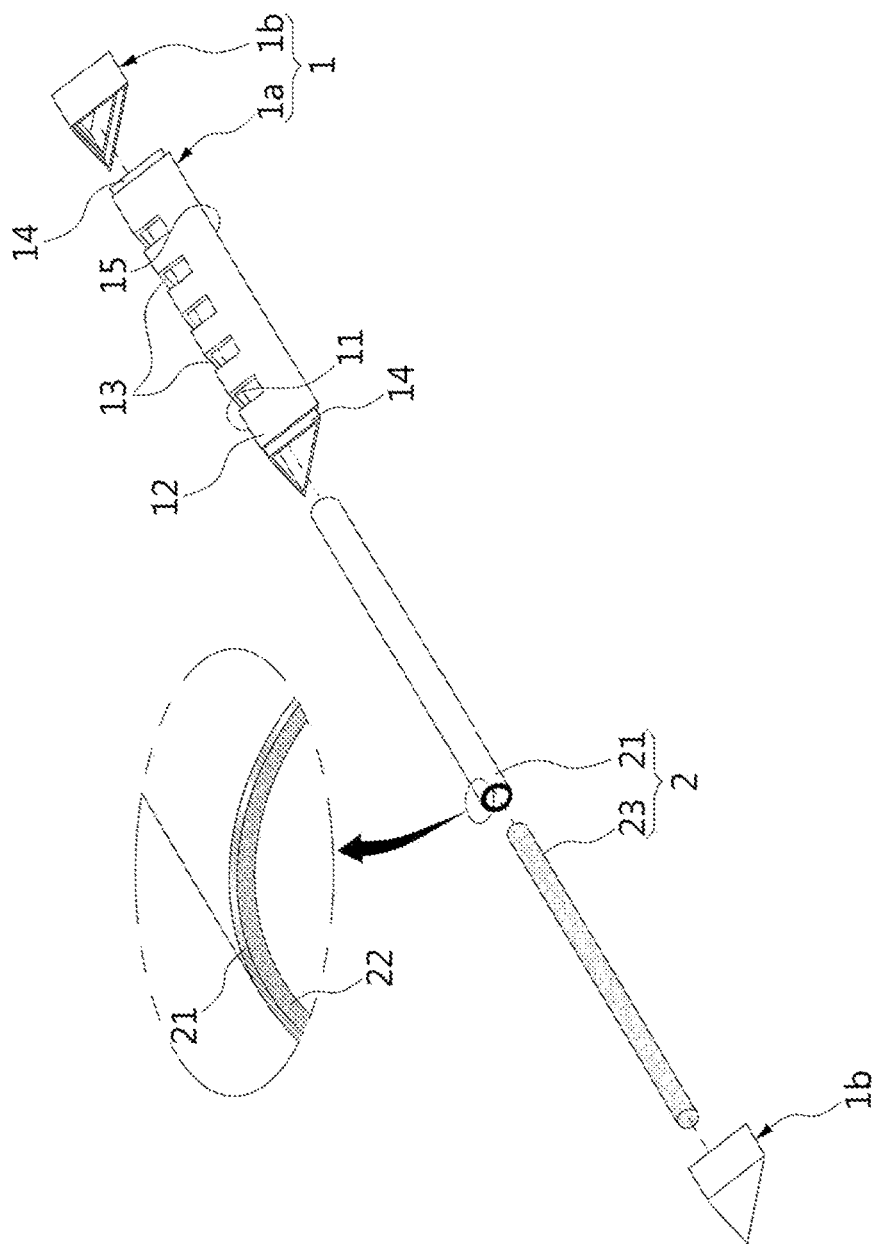
FIG. 3 is an exploded perspective view of a trap for controlling termites according to an embodiment of the present invention.

FIG. 2 is a perspective view of a trap for controlling termites according to an embodiment of the present invention, and FIG. 3 is an exploded perspective view of a trap for controlling termites according to an embodiment of the present invention.

Referring to FIG. 2 and FIG. 3, a trap for controlling termites comprises a main body 1 of the trap, and an insecticide portion 2 disposed in the main body 1. The main body 1 is formed in shape of hollow column.

Particularly, the main body 1 includes a first outer wall 11 which touches a first installment surface p1 on which the trap is installed, and a second outer wall 12 which touches a second surface p2 on which the trap is installed. The second outer wall 12 is connected to the first outer wall so as to have a tilt angle against the first outer wall 11. Thereby, the trap is able to have excellent control effect by being installed on movement routes of termites, such as edge parts or narrow corridors.

In addition, a termite entrance hole 13 is formed on the main body 1, so that termites can enter into a hollow portion of the main body 1 where the insecticide portion 2 is inserted. At least one termite entrance hole 13 is formed on the first outer wall 11 or the second outer wall 12. In this embodiment, the plurality of termite entrance holes 13 are formed in shape of incised square grooves along longitudinal direction of the main body 1 on a joint part of the first outer wall 11 and the second outer wall 12.

Furthermore, the main body 1 could be made of papers, plastics, or vinyl materials etc. If the main body 1 is able to block movement routes of termites like edge parts effectively, the main body 1 could have any shapes such as square columns etc. without any limitations. In this embodiment, the main body 1 is formed in shape of triangular column so as to be fitted to edge parts.

In more detail, in this embodiment, the main body 1 comprises a column portion 1a in shape of triangular column, and a lid portion 1b which is inserted to one end or both ends of the column portion 1a. The lid portion 1b is formed in shape corresponding to shape of the column portion 1a. A lid mounting portion 14 protrudes from the column portion 1a so that the lid portion 1b is able to be inserted. The column portion 1a and the lid portion 1b are formed in shape of triangular structure by a connecting portion 15 connected integrally with the first outer wall 11 and the second outer wall 12. Of course, the main body 1 could be implemented as single body.

The insecticide portion 2 is formed by injecting, spreading, or spraying insecticides to a base sheet 21 having a material for absorbing moisture to retain moisture.

Specifically, the insecticide portion 2 is formed in shape of roll so as to be inserted to the hollow portion of the column portion 1a, and is made by rolling the base sheet 21 to form an inner space in center.

The base sheet 21 could be made of an acid-free paper. The material for absorbing moisture 22, disposed in the base sheet 21, could be made of a super absorbent polymer so as to retain moisture for a relatively long time. A super absorbent polymer has a three dimensional network structure and has many hydrophilic groups. As a super absorbent polymer, it is able to be used that graft copolymers obtained by copolymerizing acrylonitrile with starch or cellulose, or block copolymers of acrylic acid or vinyl alcohol formed in powder or fiber. The reason why a super absorbent polymer is used as the material for absorbing moisture 22 is to maintain control effect for a relatively long time by retaining moisture which termites prefer.

In addition, the super absorbent polymer is attached to the base sheet 21 by adhesive. Here, it is possible to use various types of adhesives, if they would have excellent adhesiveness and not be avoided by termites. In this embodiment, a cellulosic adhesive is applied.

A termite food material 23 is inserted into the inner space of the base sheet 21 or the hollow portion of the main body 1 of the trap in order to entice termites. As the termite food material 23, various types of foods are able to be placed with no limitation, including fibers or pulp known as a food of termites. In this embodiment, absorbent cotton is inserted as the termite food material 23.

As for insecticides, any types of insecticides (not shown) can be used, if they could have an excellent control effect and be diluted with water. In this embodiment, a 1% undiluted solution of metofluthrin is applied. And also, a 2 w/v % solution of bistrifluron that is made by applying alcohol as a solvent could be used as the insecticide.

Hereinafter, operation of the trap for controlling termites according to an embodiment of the present invention is briefly described.

Figure 4:
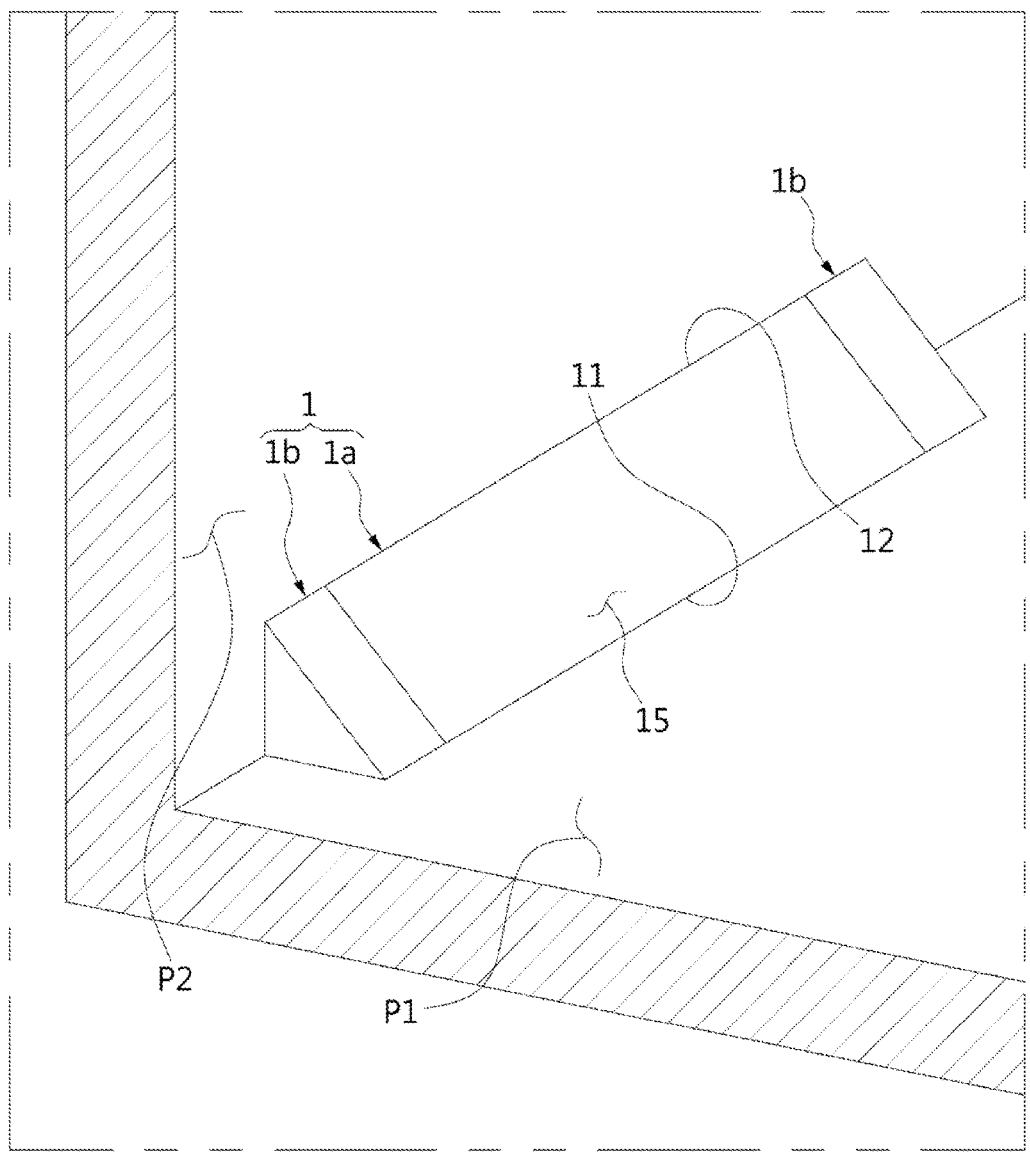
FIG. 4 is a diagram for illustrating behaviors of a trap for controlling termites according to an embodiment of the present invention.

FIG. 4 is a diagram for illustrating behaviors of a trap for controlling termites according to an embodiment of the present invention.

Referring to FIG. 4, the insecticide portion 2 is formed by attaching the super absorbent polymer that is the material for absorbing moisture 22 with adhesive to the base sheet 21 made of an acid-free paper, dropping a 1% undiluted solution of metofluthrin, rolling up the base sheet 21, and then inserting absorbent cottons into the inner space of the base sheet 21.

After inserting the insecticide portion 2 into the column portion 1a of the main body 1, close the lid portion 1b, and then dip it into water for about 5 minutes to make moisture permeates into the super absorbent polymer.

After installing the trap for controlling termites produced by aforementioned steps on edge parts of building as shown in FIG. 4, an experiment was conducted by putting *Reticulitermes speratus* into the trap. As a result, it was found that termites entered through the termite entrance hole 13 after moving to the edge parts and then died.

Hereinafter, another embodiment according to the present invention is described. However, a detailed description same or similar components as the embodiment described above will be skipped and different components will be mainly described.

Figure 5:
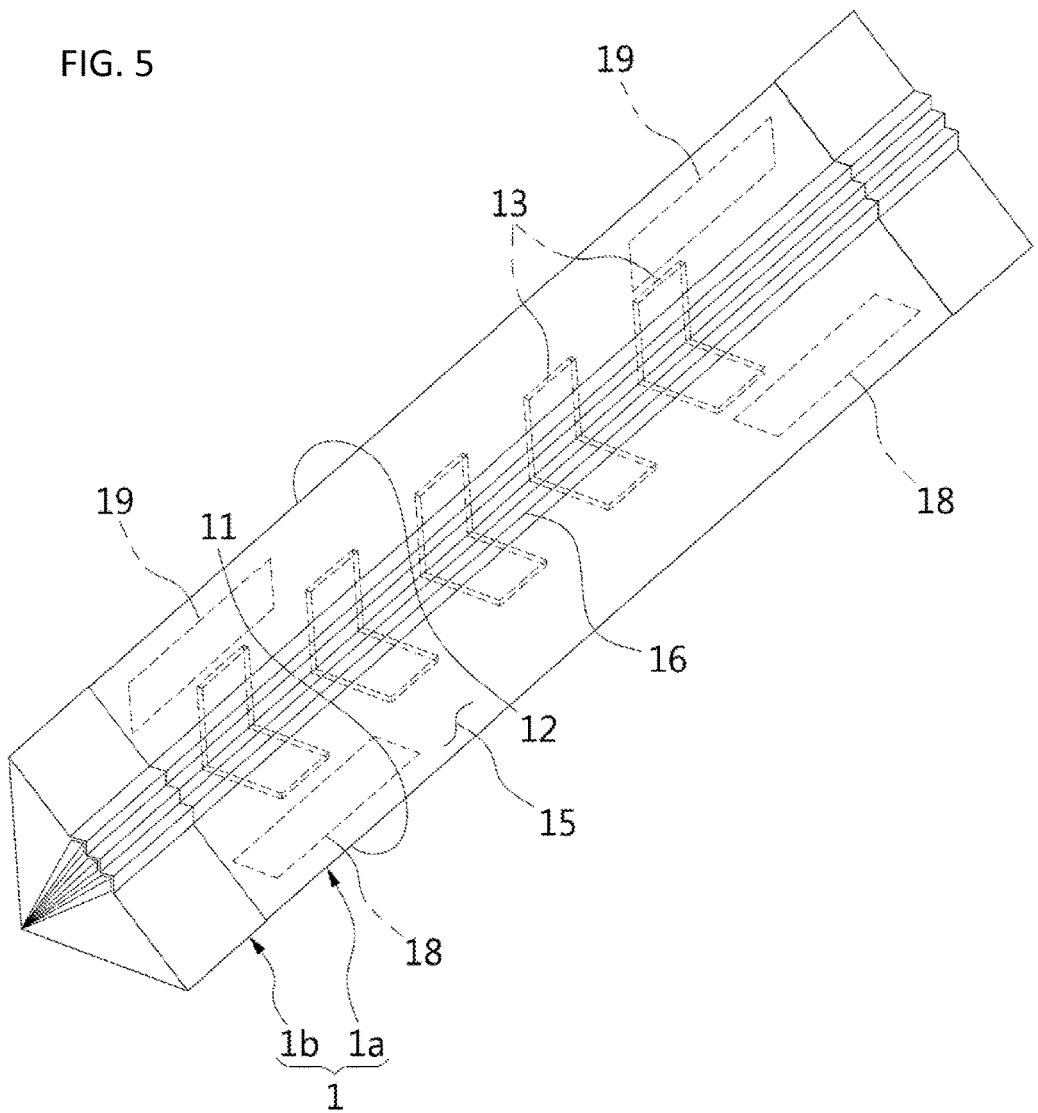
FIG. 5 is a perspective view of a trap for controlling termites according to another embodiment of the present invention.
Figure 6:
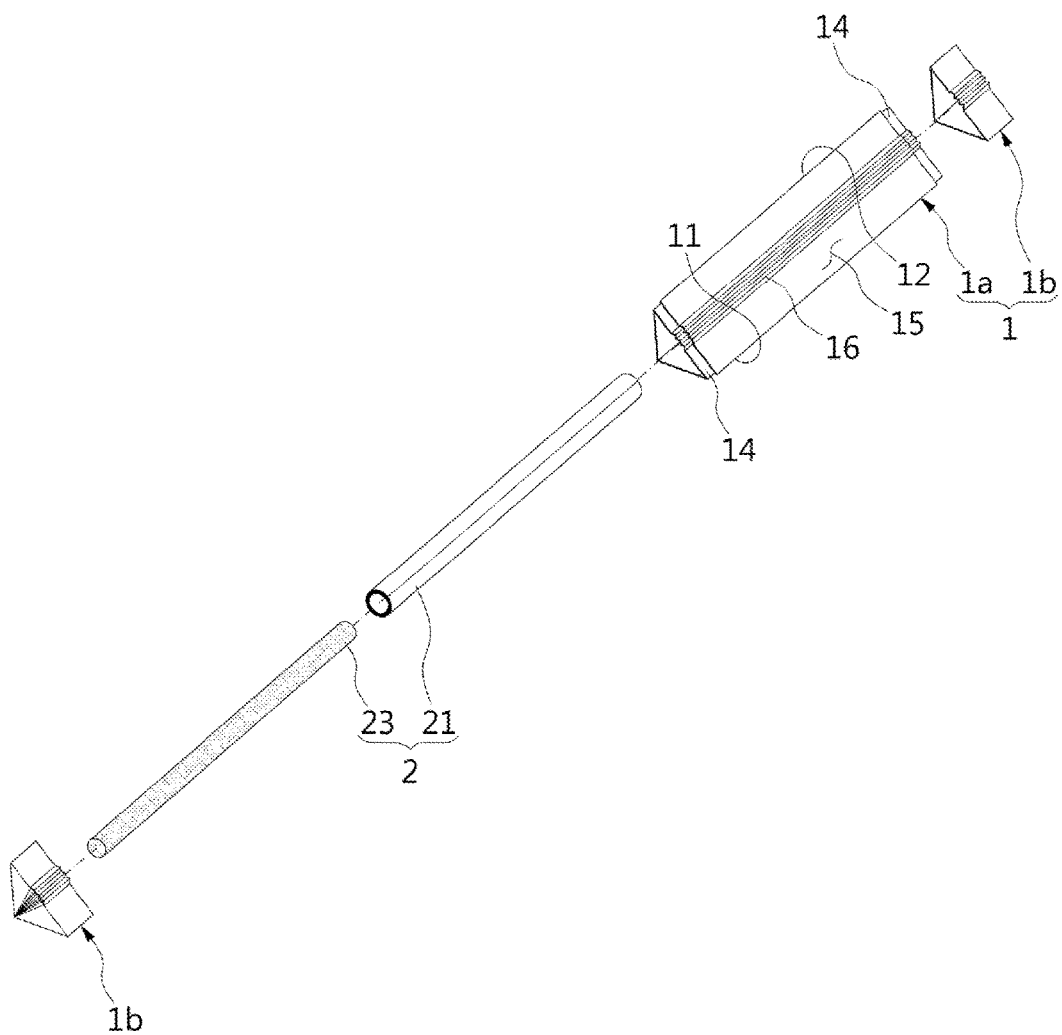
FIG. 6 is an exploded perspective view of a trap for controlling termites according to another embodiment of the present invention.
Figure 7:
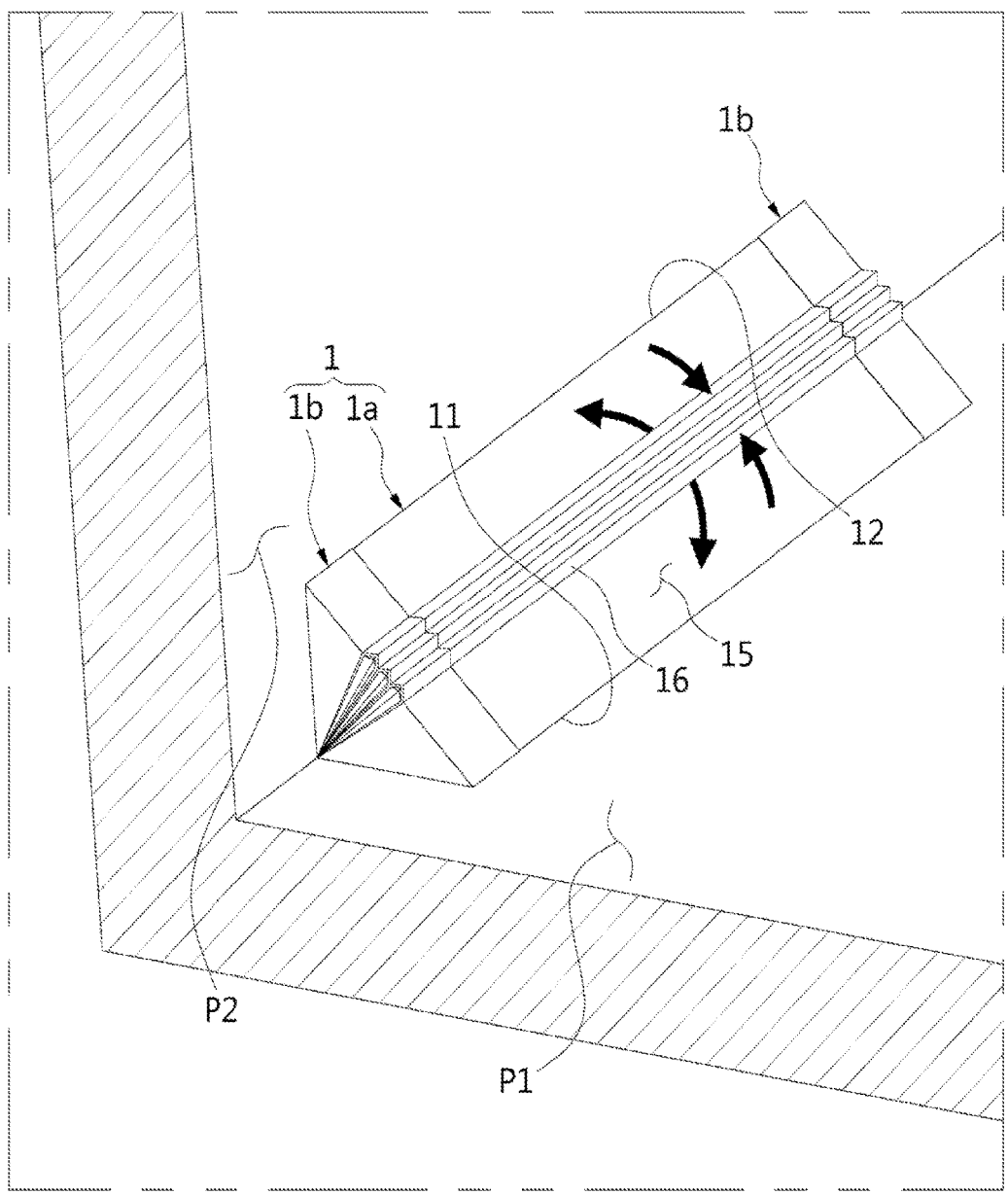
FIG. 7 is a diagram for illustrating behaviors of a trap for controlling termites according to another embodiment of the present invention.

FIG. 5 is a perspective view of a trap for controlling termites according to another embodiment of the present invention, FIG. 6 is an exploded perspective view of a trap for controlling termites according to another embodiment of the present invention, and FIG. 7 is a diagram for illustrating behaviors of a trap for controlling termites according to another embodiment of the present invention.

Referring to FIG. 5 to FIG. 7, the trap for controlling termites according to another embodiment of the present invention comprises a main body 1 of the trap and an insecticide portion 2 disposed in the main body 1. The main body 1 has first and second outer walls 11, 12 and termite entrance holes 13. The first outer wall 11 touches a first installment surface p1, and the second outer wall 12 touches a second installment surface p2.

Further, the main body 1 has a connecting portion 15 connected between the first outer wall 11 and the second outer wall 12. The connecting portion 15 has a pleat portion 16 to adjust the angle of the first outer wall 11 and the second outer wall 12.

The pleat portion 16 is a component for compatible use in either case that the angle between the first installment surface p1 and the second installment surface p2 is an acute angle or an obtuse angle. In this embodiment, the pleat portion 16 is formed that pleats having peaks and valleys are closely placed each other. The number of pleats could be changed according to the size of main body 1. In addition, the lid portion 1b has pleats 16 also on the closed surface of the body so as to provide expansion and contraction, besides pleats connected with pleats formed on the connecting portion 15 of the column portion 1a.

In addition, considering that the angle between the first outer wall 11 and the second outer wall 12 could be adjusted, the trap for controlling termites according to another embodiment of the present invention further comprises a first binding member 18 for fixing outer wall 11 on the first installment surface p1 and a second binding member 19 for fixing outer wall 12 on the second installment surface p2. Thereby the main body 1 is able to be fixed more strongly.

Although the first and second binding members 18, 19 could be formed by removable binding means including Velcro fastener, in this embodiment, they are formed by attaching double-sided tape to the first outer wall 11 and the second outer wall 12 in order to avoid cracks in the installed state.

As aforementioned trap for controlling termites according to the embodiment of the present invention, the trap according to another embodiment of the present invention has a use of controlling or removing termites by installing on main movement routes of termites. In addition, due to the pleat portion 16, it is able to adjust angle between the first outer wall 11 and the second outer wall 12. Therefore, it could be used compatibly in either case that the angle between the first installment surface p1 and the second installment surface p2 is an acute angle or an obtuse angle.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

The terms used in the above described embodiments are merely used to explain particular embodiments, and are not intended to limit the scope of the present invention. Unless having different meaning contextually, singular form of words include plural form of words, too. In this description, it should be understood that the words of "comprise" or "have" are used to include characteristic, number, step, operation, elements, parts or combination thereof, but aren't be used to in advance exclude the possibility of presence or addition of another characteristic, number, step, operation, elements, parts or combination thereof.

What is claimed is:

1. A trap for controlling termites in order to remove termites, the trap comprising:
   a main body; and
   an insecticide portion disposed in the main body;
   wherein the main body has a hollow triangular structure having a triangular body portion, and at least one lid portion connected to at least one end of the triangular body portion,
   wherein the triangular body portion includes:
   a first outer wall configured to contact a first installment surface,
   a second outer wall configured to contact a second installment surface, the second outer wall being connected to the first outer wall so as to form an angle between the first outer wall and the second outer wall,
   a connecting portion connecting the first outer wall with the second outer wall, and at least one lid mounting portion protruding from the at least one end of the triangular body portion to allow the at least one lid portion to be mounted thereon, wherein a plurality of termite entrance holes is formed on a joint part of the first outer wall and the second outer wall along a longitudinal direction of the triangular body portion, wherein the connecting portion has a pleat portion having pleats with peaks and valleys to adjust the angle between the first outer wall and the second outer wall, and wherein the at least one lid portion has pleats so as to enable the at least one lid portion to expand or contract.

2. The trap for controlling termites according to claim 1, wherein the insecticide portion includes a base sheet which has a material for absorbing moisture to retain moisture and is configured to receive an insecticide.

3. The trap for controlling termites according to claim 2, wherein the base sheet is made of an acid-free paper and has an inner space, wherein the material for absorbing moisture is made of an absorbent polymer, and wherein the inner space of the base sheet is configured to accommodate a termite food material.

4. The trap for controlling termites according to claim 1, further comprising:

a first binding member for fixing the first outer wall on the first installment surface; and a second binding member for fixing the second outer wall on the second installment surface.

\* \* \* \* \*